June 23, 1936.  G. W. EMRICK  2,045,452
CLUTCH
Filed May 5, 1934
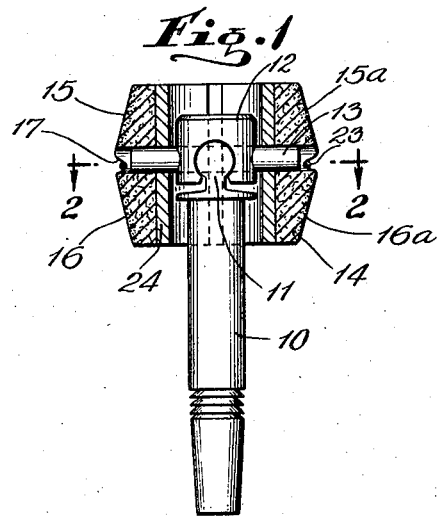
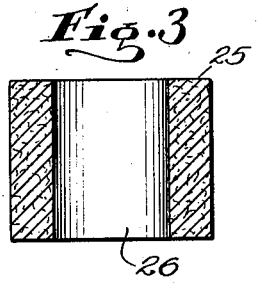
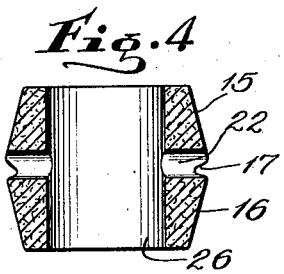
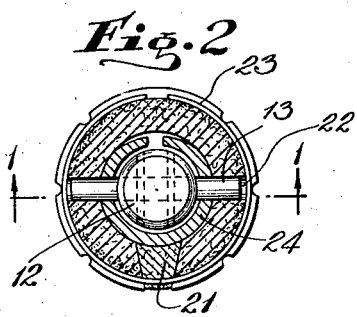
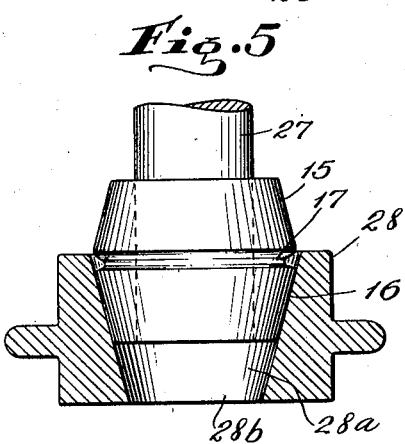
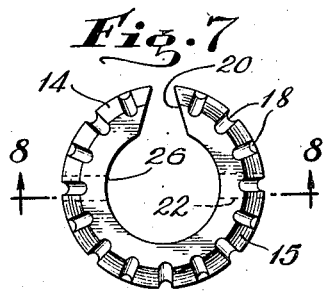
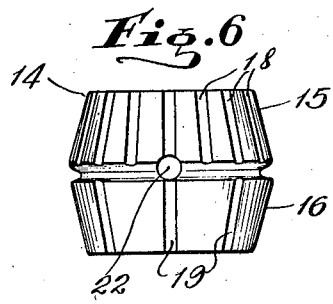
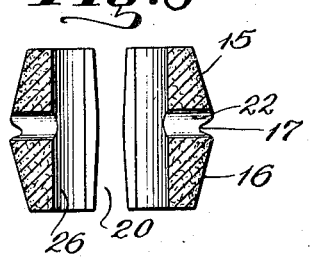
INVENTOR
GEORGE W. EMRICK
BY
ATTORNEY Patented June 23, 1936

2,045,452

UNITED STATES PATENT OFFICE 2,045,452

CLUTCH

George W. Emrick, Brooklyn, N. Y.

Application May 5, 1934, Serial No. 724,110

14 Claims. (Cl. 192—107)

This invention relates to clutch devices and to the method of constructing clutch devices and particularly to the facing, friction or gripping surface thereof; and the object of the invention is to provide a clutch, the face of which is composed of suitable fibrous material, such for example as asbestos or asbestos cloth or paper impregnated with a thermoplastic or similar material or a thermo setting type of phenol condensating resin, and still further, to the heat treatment of the friction surface of a clutch element of this kind so as to displace the fluid content at the surface of the impregnated material and to harden said surface or to substantially carbonize the same without rendering such surface excessively brittle; a further object being to form grooves in the friction surface to reduce the contact area thereof as well as to provide lubricating or other channels in such surface; a further object being to provide a clutch of the class described in the form of a double cone body providing two conical clutch surfaces which are coned or contracted to opposed ends thereof to adapt the clutch for use as a clutch element in tapping attachments and similar devices or apparatus; a still further object being to provide a clutch of the class described which is fashioned from a tubular body of asbestos or similar material impregnated and heat treated in accordance with the method more fully hereinafter described and claimed.

The invention is fully disclosed in the following specification, of which the accompanying drawing forms a part, in which the separate parts of my improvement are designated by suitable reference characters in each of the views, and in which:

Fig. 1 is a sectional view of a clutch unit assemblage indicating one use of the invention, the section being on the line 1—1 of Fig. 2.

Fig. 2 is a section on the line 2—2 of Fig. 1.

Fig. 3 is a sectional view of a tubular blank from which a clutch such as shown in Figs. 1 and 2 is formed.

Fig. 4 shows the next step in shaping the blank shown in Fig. 3.

Fig. 5 shows the step of heat treating the workpiece.

Fig. 6 shows the next step in forming the clutch.

Fig. 7 is a plan view of the clutch shown in Fig. 6 indicating the next step in the operation of producing the same; and, Fig. 8 is a section on the line 8—8 of Fig. 7.

For the purpose of illustrating one use of my invention, I have shown in Figs. 1 and 2 of the drawing, a clutch unit or assemblage which constitutes a part of the clutch mechanism described and claimed in a companion application filed May 5, 1934, and bearing Serial No. 724,109.

In Figs. 1 and 2, 10 represents a driven spindle or shaft, the upper end of which is provided with a cylindrical head 11 on which is slidably and rotatably mounted a coupling block 12 forming part of a universal joint mounting of the spindle. A pin 13 is passed transversely through the block 12 at right angles to the arrangement of the head 11 therein, and the block 12 is rotatable on the pin 13 as well as being movable longitudinally thereof. The cylindrical head 11 is yoke-shaped in form to clear the pin 13 as disclosed in said companion application.

At 14 I have shown one of my improved clutch members or facings, and this member is shaped to form conical, clutch or friction faces 15 and 16 subdivided by a circumferential groove 17 centrally of said member. The facing 15 has a plurality of grooves 18 formed therein to reduce the contact area of the surface 15 as well as to provide oil or lubricating channels in such surface, whereas the surface 16 has similar grooves 19 which are less in number than the grooves 18. The member 14 has a dove-tailed split 20 at one side thereof to provide for the extension and contraction of said friction member in the use thereof. A pad or strip 21 of felt or other material is arranged in the split 20 to act as a distance piece and also to aid in supporting the lubricant when employed in conjunction with the clutch.

The member 14 is provided with a bore 22 extending therethrough at right angles to the split 20 for receiving the pin 13. This pin is held against displacement by a spring ring 23 which seats in the groove 17, the ring 23 also serving to hold the felt strip 21 against displacement. In the bore of the member 14 is a split tube 24 preferably composed of spring material, and this tube is apertured to receive the pin 13 and serves to normally hold the member 14 in extended position, and at the same time, permits the contraction of said member under pressure against the tension of the split tube 24. It will be noted that the split of the tube 24 is disposed opposite the split 20 in the member 14.

In forming the member 14 herein specifically described, I first start with a tube 25 of wrapped or pressed fibrous material impregnated with a thermo setting material in the class of synthetic resins, phenols and the like. For the purpose of giving one illustration, the tube 25 may be composed of asbestos cloth or paper impregnated with a thermoplastic material or a thermo setting material in the class of synthetic resins or phenols. After producing this tube of a desired length and thickness, the same is shaped to form temporary conical friction surfaces 15 and 16, a groove 17 as well as the bore or aperture 22.

After forming the tubular blank 25 in the manner indicated in Fig. 4 of the drawing, I place in the bore 26 thereof, a rod or mandrel 27 which serves as a means of handling the workpiece as well as a cooling agent for the inner wall structure of the workpiece when subjecting it to the heat treatment of a heater ring or other heating element 28. In this connection, if desired, means may be provided for cooling the mandrel. This ring or element may be composed of cast iron, nichrome or other material.

In forming the member 14 herein disclosed, the heating element 28 is heated to approximately 1400° Fahrenheit, and is removed from a heating furnace and the member 14 is placed in the ring 28 so that one friction surface 15—16 is disposed in engagement with the conical heating chamber 28a of the element 28 in the manner indicated in Fig. 5, to subject such surface to the heat of the ring. This heat treatment takes but a short period of time, and during the treatment, the fluid contained at the surface of the member being treated will be drawn from said surface and discharged through the lower open end 28b of the element 28, and the heat treated surface will be converted into a relatively hard coating or layer which might be termed a carbonization of the surface to such a degree as to provide a smooth hard surface which is reinforced, strengthened and supported by the fibrous body of the member as a whole. The depth or thickness of the treated surface will depend upon the degree of treatment as well as other characteristics of the impregnated fibrous material employed. In Fig. 1 of the drawing, the stippling at 15a, 16a indicated the heat treated outer surface.

After one surface of the member 14 has been treated, the other surface thereof will be treated in a similar manner, it being desirable to allow the member to cool slightly between each treatment. By using a series of mandrels as well as a number of the heating elements 28 employed, a successive series of heat treating operations may be performed on different workpieces.

After both beveled surfaces 15, 16 of the member 14 have been heat treated, the same are ground or otherwise finished to the desired size and contour. The next step in the method consists in forming the grooves 18 and 19 in the surfaces 15 and 16, and then the member 14 is split in the angular manner indicated at 20 in Fig. 7 of the drawing so as to provide a substantially dove-tailed recess between adjacent cut or split ends of the tubular member or body 14 to receive the pad 21.

The member 14 is now complete and ready for assemblage of the spring sleeve 24 and spindle 10 therewith as well as the pin 13, pad 21 and ring 23. It will be understood that the impregnation of the member 14 with fibrous material employed therein is relatively slight, that is to say, there is no excessive amount of the synthetic resins or other impregnating material employed beyond the saturating point.

It will therefore be seen that in the heat treatment above referred to and in removing the fluid of the impregnating substance from the surface of the member 14, what remains on the surface is the fibrous material and a part of said impregnating substance in the form of a hard, smooth surface body or facing which in its characteristics gradually fades into the normal fibrous saturated body constituting the core or inner body structure of said member, thus providing a resilient or yielding support which eliminates to a large degree the possibility of chipping, flaking or cracking, and maintains substantially the full strength and toughness of the original body. The heat treated surface having been subjected to relatively high degrees of heat will adapt the member 14 to the normal or any excess heat which may prevail in its operation as a friction element without destruction or change in the characteristics of said preformed and heat treated friction surface.

It will be understood that my invention is not necessarily limited to the production of a friction member of the specific kind or shape herein disclosed nor for the use herein intended. My improved method is applicable to friction members or elements of any kind or class, and particularly where the friction member operates in oil or is subjected to exposure to a lubricant, and various other changes in and modifications of the construction and method herein disclosed may be made within the scope of the appended claims without departing from the spirit of my invention or sacrificing its advantages.

Having fully described my invention, what I claim as new and desire to secure by Letters Patent, is:

1. A friction member comprising a body of heat resisting fibrous material including a thermoplastic binder, and the binder being carbonized at the outer bearing surface of said body for a predetermined depth only of the body.

2. A friction member comprising a body of heat resisting fibrous material including a thermoplastic binder, the binder being carbonized at the outer bearing surface of said body for a predetermined depth of the body, and the remainder of the body inwardly of said outer bearing surface and including the fibrous material at such surface serving to support and maintain said surface.

3. A friction member comprising a body of heat resisting fibrous material including a thermoplastic binder, the binder being carbonized at the outer bearing surface of said body for a predetermined depth of the body, the remainder of the body inwardly of said outer bearing surface and including the fibrous material at such surface serving to support and maintain said surface, and said surface being beveled and grooved.

4. A friction member comprising a body of heat resisting fibrous material including a thermoplastic binder, the binder being carbonized at the outer bearing surface of said body for a predetermined depth of the body, and said body being in the form of a split tube.

5. A friction member comprising a body formed from layers of heat resisting fibrous material including a thermoplastic binder, one surface of said body being shaped to form a friction surface, the binder of said friction surface for a predetermined depth of the body including the thermoplastic binder in carbonized form.

6. A friction member comprising a tubular body formed from circumferential layers of heat resisting fibrous material including a thermoplastic binder, one surface of said tubular body being beveled to form a friction surface, and the binder of said friction surface for a predetermined depth of the body including the thermoplastic binder in carbonized form, and the carbon surface being supported and reinforced by the fibrous material of said body including the uncarbonized binder thereof.

7. A friction member comprising a body formed from layers of asbestos paper including a thermoplastic binder, one surface of said body for a predetermined depth comprising asbestos and the thermoplastic binder in carbonized form.

8. A friction member comprising a body formed from layers of asbestos paper including a thermoplastic binder, one surface of said body for a predetermined depth comprising asbestos and the thermoplastic binder in carbonized form, said body being tubular in form, and the friction surface thereof being beveled.

9. A friction member of high heat resisting properties, comprising an asbestos body treated with a thermoplastic binder, one surface of said body constituting the friction surface, said friction surface comprising a layer extending a predetermined depth into the body and being composed of asbestos and a carbonized binder, and said surface being supported and reinforced by the non-carbonized treated asbestos constituting the remainder of said body.

10. A friction member of high heat resisting properties, comprising an asbestos body treated with a thermoplastic binder, one surface of said body constituting the friction surface, said friction surface comprising a layer extending a predetermined depth into the body and being composed of asbestos and a carbonized binder, said surface being supported and reinforced by the non-carbonized treated asbestos constituting the remainder of said body, said body being in the form of a split tube, and the friction surface of said tube being beveled.

11. A friction member of high heat resisting properties comprising a tubular body formed from a wrapped asbestos strip including a thermoplastic binder compressed therewith, one surface of said body constituting the friction surface, and said friction surface being formed by the asbestos of said body and the binder in carbonized form.

12. A friction member comprising a body of heat resisting fibrous material including a thermoplastic substance, said body having two oppositely beveled friction surfaces, and a heat treated thermoplastic substance at said friction surfaces for a predetermined depth of said body.

13. A friction member comprising a body of heat resisting fibrous material including a thermoplastic substance, said body having two oppositely beveled friction surfaces, a heat treated thermoplastic substance at said friction surfaces for a predetermined depth of said body, the fibrous material of said body consisting of a major part of asbestos, and the thermoplastic substance comprising a phenol condensating resin.

14. A friction member of high heat resisting properties comprising an asbestos body impregnated with a thermoplastic material, said body being shaped to form a beveled friction surface thereon and to provide means for mounting the body in connection with a support, the thermoplastic material at the friction surface of said body being carbonized for a predetermined depth, and the asbestos and carbonized material at such surface being yieldably supported by the remainder of the impregnated asbestos material.

GEORGE W. EMRICK.